United States Patent
Schreck et al.

(10) Patent No.: US 7,558,015 B2
(45) Date of Patent: Jul. 7, 2009

(54) ACTUATION EFFICIENCY BASED CONTACT DETECTION

(75) Inventors: Erhard Schreck, San Jose, CA (US);
Rickmer Kose, San Francisco, CA (US);
Bruce Schardt, Mission Viejo, CA (US);
Davide Guarisco, San Jose, CA (US)

(73) Assignee: Maxtor Corporation, Scotts Valley, CA (US)

( * ) Notice: Subject to any disclaimer, the term of this patent is extended or adjusted under 35 U.S.C. 154(b) by 188 days.

(21) Appl. No.: 11/693,596

(22) Filed: Mar. 29, 2007

(65) Prior Publication Data

US 2007/0230018 A1  Oct. 4, 2007

Related U.S. Application Data

(60) Provisional application No. 60/743,905, filed on Mar. 29, 2006.

(51) Int. Cl.
*G11B 21/02* (2006.01)
(52) U.S. Cl. .................................................. 360/75
(58) Field of Classification Search .................. 360/75, 360/31, 69, 59, 235.7
See application file for complete search history.

(56) References Cited

U.S. PATENT DOCUMENTS

| | | | |
|---|---|---|---|
| 5,787,570 A | 8/1998 | Ressmeyer et al. | |
| 6,191,901 B1 * | 2/2001 | Carlson et al. | 360/31 |
| 6,268,976 B1 * | 7/2001 | Carlson et al. | 360/75 |
| 6,459,539 B1 * | 10/2002 | Carlson et al. | 360/31 |
| 6,671,110 B2 * | 12/2003 | Baba et al. | 360/31 |
| 6,801,376 B2 * | 10/2004 | Smith | 360/31 |
| 6,894,854 B1 * | 5/2005 | Carlson et al. | 360/31 |
| 6,898,034 B2 * | 5/2005 | Dakroub et al. | 360/31 |
| 6,906,878 B2 * | 6/2005 | Smith et al. | 360/31 |
| 6,975,467 B1 * | 12/2005 | Lewkowicz et al. | 360/31 |
| 6,987,628 B1 * | 1/2006 | Moline et al. | 360/31 |
| 6,999,265 B1 | 2/2006 | Schreck et al. | |
| 7,038,875 B2 | 5/2006 | Lou et al. | |
| 7,061,706 B2 | 6/2006 | Conteras et al. | |
| 7,079,337 B2 * | 7/2006 | Tokizono et al. | 360/31 |
| 7,092,193 B1 | 8/2006 | McKenzie et al. | |
| 7,180,692 B1 * | 2/2007 | Che et al. | 360/31 |
| 7,215,495 B1 * | 5/2007 | Che et al. | 360/31 |
| 7,292,401 B2 * | 11/2007 | Shen et al. | 360/69 |
| 7,298,566 B2 * | 11/2007 | Ueda et al. | 360/31 |
| 7,330,324 B2 * | 2/2008 | Morinaga et al. | 360/59 |
| 7,339,765 B2 * | 3/2008 | Takagi | 360/235.7 |
| 7,342,736 B1 * | 3/2008 | Turner et al. | 360/75 |
| 7,440,219 B2 * | 10/2008 | Zhu et al. | 360/75 |
| 7,480,115 B2 * | 1/2009 | Hiroyuki et al. | 360/75 |
| 2004/0247285 A1 | 12/2004 | Bonfiglio et al. | |
| 2005/0146803 A1 | 7/2005 | Kim et al. | |
| 2006/0056094 A1 | 3/2006 | Fu et al. | |

\* cited by examiner

*Primary Examiner*—Fred Tzeng
(74) *Attorney, Agent, or Firm*—Westman, Champlin & Kelly, P.A.

(57) ABSTRACT

In one example, a method is provided and includes comparing a measured change in spacing between a transducer element and a storage element in response to a fly height control signal with an expected change in spacing for the applied fly height control signal. The method also includes detecting an event condition based on the comparison between the measured change in spacing and the expected change in spacing.

20 Claims, 4 Drawing Sheets

ACTUATION EFFICIENCY BASED CONTACT DETECTION

CROSS-REFERENCE TO RELATED PATENT APPLICATIONS

This application claims priority under 35 U.S.C. § 119(e) from U.S. Provisional Application Ser. No. 60/743,905, filed Mar. 29, 2006, titled METHOD FOR DETECTING HEAD DISK CONTACT DURING FLY HEIGHT ACTUATION, which is hereby incorporated herein by reference in its entirety and for all purposes.

BACKGROUND

Embodiments of the present invention relate generally to the field of adjusting the fly height of a sensor and, more particularly, to contact detection.

Magnetic storage disk drives includes one or more disks having a magnetic surface for storing data on concentric tracks. The disks are rotated about a central spindle at a spin rate that depends on the particular disk drive. Data is written to and read from the magnetic disk by a magnetic transducer positioned above the disk surface. The transducer typically includes a read head to read data from the disk and a write head for writing data to the disk.

To write data to or read data from the storage disk, the transducer is positioned above the storage disk while the storage disk is spinning. The transducer is positioned on a slider which is generally mounted on a gimbaled flexure portion. The gimbaled flexure portion is attached to one end of a suspension's load beam assembly. An opposite end of the suspension's load beam assembly is attached to the in-line rotary voice coil actuator, which provides pivotal motion to slider. A spring biases the load beam and slider with the read/write transducer towards the storage disk, while the air pressure beneath slider developed by storage disk rotation relative to slider pushes slider away from the storage disk. The gimbaled flexure enables slider to present a "flying" attitude toward the storage disk surface and follow its topology. An equilibrium distance defines an "air bearing" and determines the "flying height" of the transducer. Although the separation between the transducer and storage disk created by the air bearing reduces transducer efficiency, the avoidance of direct contact of the slider with the storage disk improves reliability and extends the useful life of the read/write transducer and storage disk.

For typical disk drives, nominal flying heights are on the order of 0.1 to 0.5 micro inches. For a given transducer, the magnetic storage density of the disk increases as the space between the transducer and the storage surface of the storage disk is reduced. Thus, a very low flying height is desirable and must be balanced with transducer reliability over a reasonable service life of the storage disk drive.

During operation, flight height adjustments occur through the use of a thermal control module. The thermal control module typically includes a heater circuit which, when heated, actuates the transducer. As a voltage is applied to the thermal control module and the heater circuit is heated, the transducer is moved downward toward the surface of the disk. With sufficient voltage or power applied, the transducer or the slider on which the transducer is mounted may make contact with the disk surface.

Conventional disk drives detect contact between the slider and the disk surface via detection of friction between the transducer and the disk surface. The friction is detected by way of a position error signal from the disk drive resulting from the contact. This manner of detecting contact requires sufficient contact to be made to cause the friction. Such hard contact can result in reduced reliability of the disk drive.

SUMMARY OF THE INVENTION

In accordance with embodiment of the invention, detection of contact between a sensor, such as a data head or a slider, and a surface, such as the magnetic surface of a disk is achieved using the efficiency of actuator associated with the sensor. In this manner, the fly height of the sensor can be calibrated substantially continuously.

In one embodiment of the invention, a method comprises comparing a measured change in spacing between a transducer element and a storage element in response to a fly height control signal with an expected change in spacing for the applied fly height control signal; and detecting an event condition based on the comparison between the measured change in spacing and the expected change in spacing.

In another embodiment of the invention, a controller comprises a fly height control module adapted to compare a measured change in spacing between a transducer element and a storage element in response to a fly height control signal with an expected change in spacing for the applied fly height control signal. The fly height control module is further adapted to detect an event condition based on the comparison between the measured change in spacing and the expected change in spacing.

In another embodiment, the invention includes a storage device comprising means for comparing a measured change in spacing between a transducer element and a storage element in response to a fly height control signal with an expected change in spacing for the applied fly height control signal, and means for detecting an event condition based on the comparison between the measured change in spacing and the expected change in spacing.

DETAILED DESCRIPTION OF THE PREFERRED EMBODIMENTS

Figure 1:
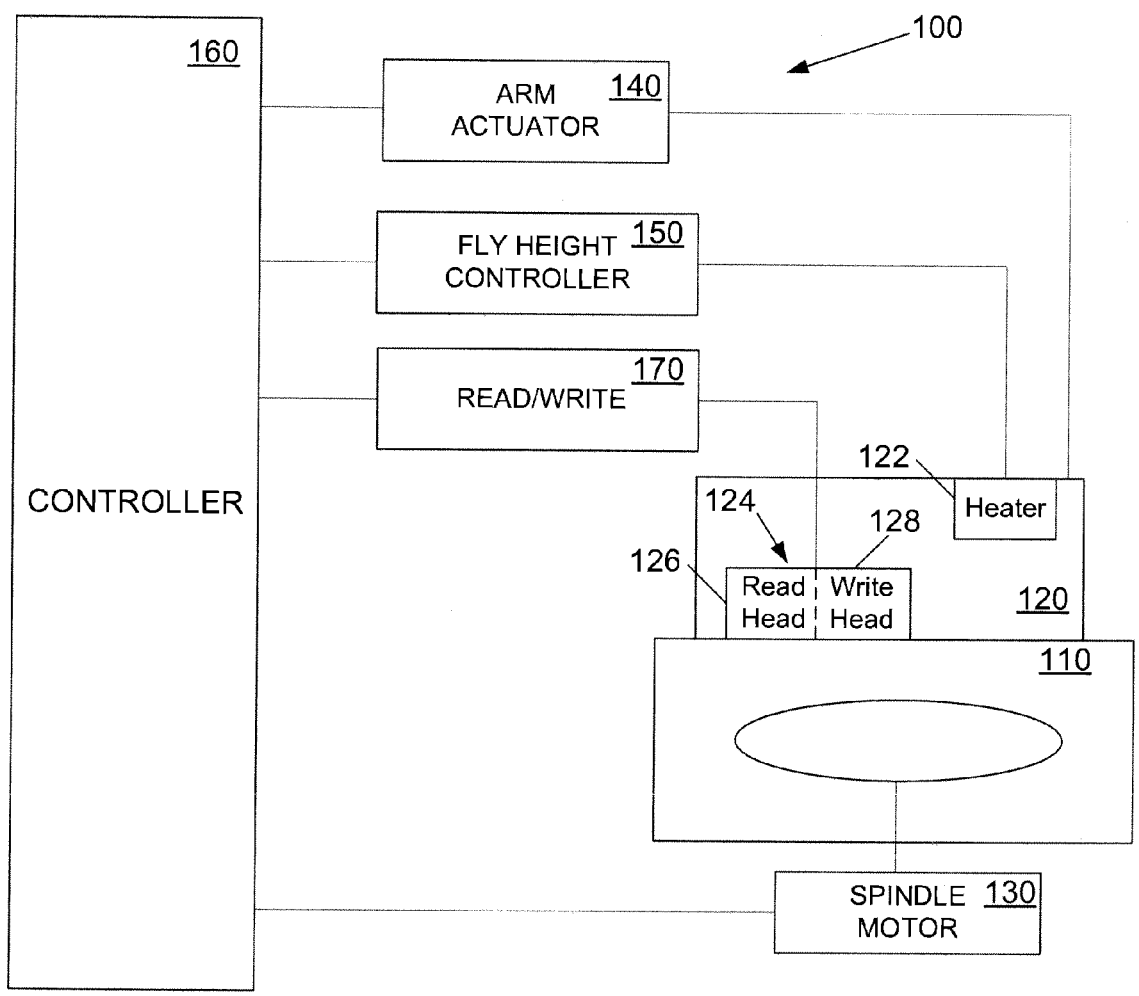
FIG. 1 is a schematic block diagram illustrating a disk drive according to embodiments of the present invention.

Referring to FIG. 1, an embodiment of a disk drive arrangement according to an embodiment of the invention is illustrated as a schematic block diagram. The disk drive arrangement 100 includes a disk module 110 with one or more disks. Each disk in the disk module 110 is adapted to spin about a central axis about a spindle. Multiple disks in the disk module 110 may spin as a single unit. The spin rate of the disks in the disk module 110 can vary depending on various factors, including processor speed, disk data density and disk size. Various disk modules 110 can have spin rates of, for example, 3600, 5200, 7200, 10,000 or 15,000 revolutions per minute (rpm). For a disk module 110 having a spin rate of 15,000 rpm, the disk makes one revolution in approximately 4 milliseconds (ms).

The disk drive arrangement 100 is provided with a spindle motor 130 coupled to the disk module 110. The spindle motor 130 drives the spinning of the disks of the disk module 110. The specific design of the spindle motor 130 may vary from one disk drive arrangement to another. The spindle motor 130 may be a three-phase electromagnetic motor, for example.

A slider module 120 including a thermal control module 122 and a transducer (data head) 124 is also provided in the disk drive arrangement 100. The thermal control module 122 is responsive to electrical signals which cause the thermal control module 122 to adjust the fly height. The transducer 124 includes a read head 126 to read data from the magnetic surface of the disk and a write head 128 to write data to the magnetic surface of the disk. Thus, the transducer 124 is adapted to read data from and/or write data to the disks in the disk module 110. The slider module 120 may be integrated with an arm assembly adapted to move the slider to the desired position above the disk. Slider modules and transducers are well known to those skilled in the art and do not require further explanation here.

In addition to the spindle motor 130, the disk drive arrangement 100 also includes an arm actuator 140. The arm actuator 140 may include a voice coil motor (VCM) which includes a coil responsive to current signals. The arm actuator 140 drives slider module 120 to position the data head either off the disk or to a particular position on the disk. The arm actuator 140 is adapted to move the data head to any desired radial position on the disk to read from or write to a desired track of the disk.

The disk drive arrangement 100 also includes a fly height controller 150 adapted to control the spacing between the data head and the disk when the data head is positioned above the disk. The fly height controller 150 includes a power supply for actuating a thermal control module of the slider module 120 by, for example, controlling the settings of a variable resistor. The fly height controller 150 may also include a digital-to-analog converter (DAC) to convert digital signals received from the drive controller 160, for example, into analog inputs for the power supply.

The thermal control module 122 includes an electrically-resistive heating element coupled to and controlled by the fly-height controller 150. Application of a fly height control signal, such as an electrical signal from the power supply of the fly height controller 150, causes the resistive heating element to heat, thereby causing actuation of the transducer 124 to change the spacing between the transducer 124 and the surface of the disk.

A drive controller 160 is coupled to the spindle motor 130, the arm actuator 140 and the fly height controller 150 to control the operation of the disk drive arrangement 100. Further, the drive controller 160 is adapted to transmit signals to the transducer 124 through a read/write channel 170. The drive controller 120 may also be coupled to other components of the disk drive arrangement 100 not shown in the illustrated example of FIG. 1. The drive controller 120 may be implemented in a variety of manners including, but not limited to, a software module or firmware, each of which is referred to herein as a processor. The processor of the drive controller 120 may transmit signals to the spindle motor 130, the arm actuator 140 and the fly height controller 150 based on desired operation, signals from an outside component (such as a computer CPU) or internal algorithms of the processor of the fly height controller 150, for example.

During a read or write operation of the disk drive arrangement 100, the drive controller 160 may command actuation of the spindle motor 130 to begin spinning of the disk and actuation of the arm actuator 140 to position the data head above the desired track of the disk. An air bearing is thereby formed between the data head and the spinning disk.

With the air bearing formed, the fly height controller 150 can adjust the spacing between the data head 124 and the surface of the disk by actuating the thermal control module 122. In this regard, the fly height controller 150 delivers an electrical signal (referred to herein as the "fly height control signal") to heater circuit of the thermal control module 122. Increasing the level of the fly height control signal, which may be an electrical current, voltage or power, causes an increase in the actuation of the thermal control module 122, thereby decreasing the spacing between the data head 124 and the surface of the disk ("head-disk spacing"). Conversely, decreasing the level of the fly height control signal causes a decrease in the actuation of the thermal control module 122, thereby increasing the head-disk spacing.

Figure 2:
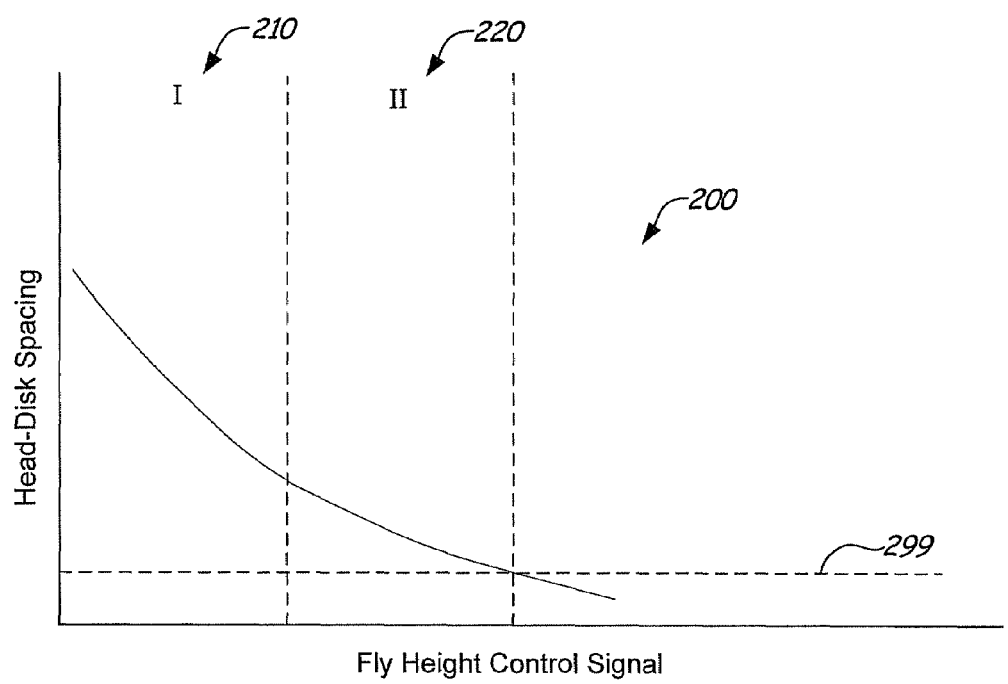
FIG. 2 is a chart illustrating the variation in head-disk spacing as a function of a fly height control signal value.

FIG. 2 is a chart 200 illustrating the variation in head-disk spacing as a function of a fly height control signal value. Generally, the change in the head-disk spacing is predictably related to changes in the fly height control signal. For example, when the fly height control signal is defined in terms of voltage, changes in the voltage are linearly related to corresponding changes in the head-disk spacing, as indicated in region I (210) of FIG. 2.

However, when the head-disk spacing becomes small, as indicated in region II (220) of FIG. 2, physical forces provide resistance to the downward movement of the data head. Thus, the relationship between the fly height control signal level and the head-disk spacing becomes non-linear. As the data head moves closer to the surface of the disk, the resistance due to the physical forces becomes greater. Thus, in region II, the level of the fly height control signal at which the data head or the slider contacts the disk (indicated by the dotted line 299 in FIG. 2) becomes less predictable.

It is noted that, at the scale of head-disk spacing on the order of micro inches, "contact" between the data head and the disk is not measured in the same terms as contact at the macro level. In this regard, contact between the data head and the disk may be defined in terms such as a specific position error signal or a predetermined friction level between the data head and the disk, for example. Thus, the head-disk spacing may continue to decrease even after the data head has contacted the disk, as indicated by the curve of FIG. 2 dropping below the contact line 299.

Further, it will be understood by those skilled in the art that the contact may occur between a storage element, such as a disk, and any of a number of components of the slider including, but not limited to, one or more transducers. Contact between the storage element and any of the components of the slider is generally referred to herein as "head-disk contact."

Figure 3:
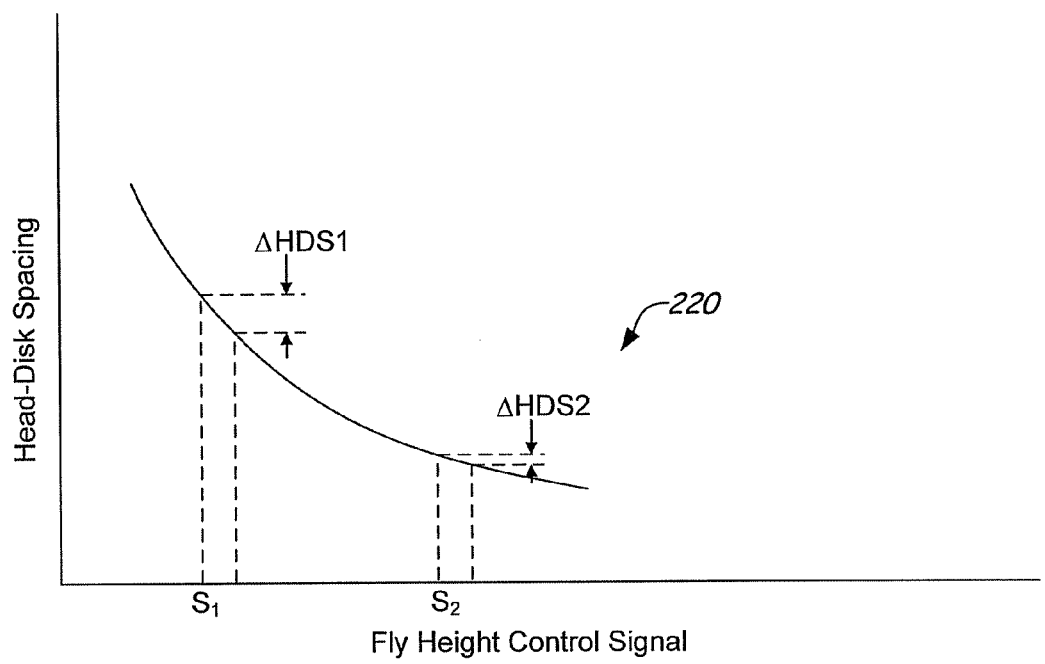
FIG. 3 is a chart illustrating the information in region II of the chart of FIG. 2 in greater detail.

FIG. 3 illustrates region II of FIG. 2 in greater detail. In this region 220, the relationship between the fly height control signal, measured in volts, to the head-disk spacing is non-linear. In this regard, changes in the head-disk spacing may be correlated to incremental changes in the fly height control signal. For example, at a fly height control signal level S1, an incremental increase in the signal (e.g., 0.1 volt) causes the disk-head spacing to decrease by ΔHDS1. At a larger fly height control signal level S2, a similar incremental increase in the signal (e.g., 0.1 volt) causes the disk-head spacing to decrease by a lesser amount, ΔHDS2.

Figure 4:
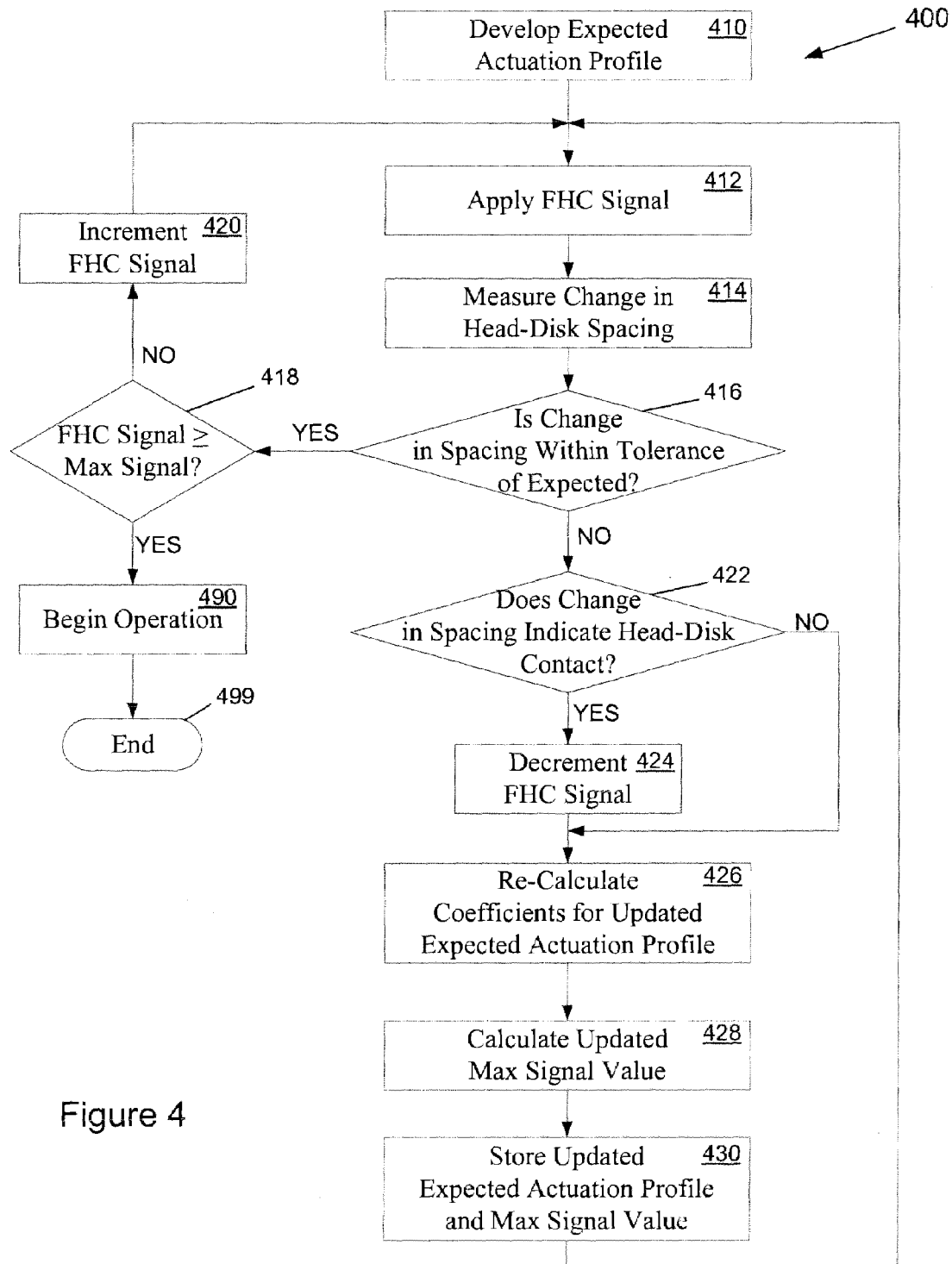
FIG. 4 is a flow chart illustrating a method of calibration of fly height actuation and detection of contact between the transducer or another portion of the slider and the disk surface according to an embodiment of the invention.

Referring now to FIG. 4, a flowchart illustrating a method of calibrating the fly height and detecting head-disk contact according to an embodiment of the invention is provided. The method 400 may be implemented, in part or whole, in the above-described processor of the disk drive controller 160, for example. In accordance with the illustrated method 400, an expected actuation profile is developed (block 410). In this regard, the actuation profile provides a change in head-disk spacing as a function of the applied fly height control signal. The initial expected actuation profile may be developed in the factory and can be stored on any of the various components of the disk drive, such as the disk drive controller 160 described above with reference to FIG. 1.

In developing the expected actuation profile, the fly height control signal level may be incrementally increased until either a predetermined maximum level is reached or until head-disk contact occurs. With each incrementing of the fly height control signal, the change in spacing may be measured and recorded, as well as recording of the corresponding fly height control signal level. In this regard, the fly height control signal level may be expressed as a current, voltage, power or other like parameter. The measurement of the change in spacing may be achieved through various known methods and systems including, but not limited to, using the harmonic sensor circuit of the read head, for example.

With the recorded measurements as a function of the fly height control signal level, a relationship may be defined. This relationship maybe expressed as a polynomial function and stored so as to be accessible by the above-described processor of the disk drive controller 160. The polynomial function and associated coefficients of the polynomial may be determined using a least square fit, for example. Such fits are well known to those skilled in the art. In one embodiment, the fly height control signal level is expressed as a voltage applied to the thermal control module, and the polynomial function has the form:

$$Y=A*X^2+B*X^4,$$

where Y is expected actuation, X is the applied voltage level, and A and B are coefficients. In this regard, the applied voltage level may be the digital input into the DAC of the fly height controller 150 described above. Thus, rather than the actual voltage applied, the "applied voltage level" (X) refers to the commanded voltage level.

In another embodiment, the fly height control signal level is expressed as a power applied to the thermal control module, and the polynomial function has the form:

$$Y=A*X+B*X^2,$$

where Y is expected actuation, X is the applied power level, and A and B are coefficients. Similar to the above-described voltage case, the applied power level may be the digital input into the DAC of the fly height controller 150. Thus, rather than the actual power applied, the "applied power level" (X) refers to the commanded power level.

As noted above, the initial development of the expected actuation profile (block 410) may be performed in a controlled environment, such as the factory. Once in the field (e.g., normal use environment), several factors may cause variations in the operation of the disk drive. For example, changes in temperature, humidity and altitude may affect the actuation of the thermal control module. In this regard, embodiments of the present invention provide for substantially continuous calibration of the fly height and/or continuous detection of head-disk contact.

Referring again to FIG. 2, at the beginning of a disk drive operation such as a read operation or a write operation, once the spindle motor is actuated and the arm actuator has positioned the data head above the desired track, the fly height of the data head is adjusted. At block 412, a fly height controller (FHC) signal is applied to the thermal control module. As noted above, the FHC signal corresponds to the input to the DAC of the fly height controller 150 and may be associated with current, voltage, power or other such parameter. The resulting change in the head-disk spacing is measured using, for example, the harmonic sensor circuit of the read head (block 412).

At block 416, the measured change in spacing is compared to the expected change for the applied FHC signal based on the stored relationship (e.g., polynomial), and a determination is made as to whether the measured change in spacing is within a predetermined tolerance of the expected change. If the measured change is within the tolerance of the expected change, a determination is made as to whether the applied FHC signal level was equal to or greater than the maximum allowable signal level (block 418). If not, at block 420, the FHC signal level is incremented by a predetermined amount (e.g., 0.1 volt), and the method returns to block 412 to apply the incremented FHC signal level.

On the other hand, if the determination is made at block 418 that the maximum FHC signal level has been surpassed, it is concluded that the data head is at the desired fly height since the measured actuation was within tolerances of the expected actuation. Accordingly, the desired operation (e.g., read or write) is initiated (block 490).

Returning now to block 416, if the measured change in spacing for a particular FHC signal level is not within the predetermined tolerance of the expected change in spacing, an event condition may be raised to the disk drive controller 160. The disk drive controller 160 may take a variety of actions as a result the notification of an event condition based on the fly height control algorithm implemented therein. In one embodiment, the disk drive controller 160 may assume the event condition is associated with head-disk contact and take appropriate actions, including re-calibration of the fly height actuation as described below with reference to block 426. In another embodiment, a separate determination is made as to whether head-disk contact has occurred (block 422). In this regard, the measured change in spacing may be compared with an expected change in spacing resulting from an incremental increase in the FHC signal at the contact point (e.g., the dotted line 299 of FIG. 2). If no contact is detected, the method 400 proceeds to block 426. On the other hand, if contact is detected, another event condition may be raised to the disk drive controller 160, the FHC signal level may be decremented (block 424) to increase the head-disk spacing, and the method 400 proceeds to block 426.

At block 426, the coefficients for the polynomial representing the expected actuation profile are recalculated. In this regard, the process described above with reference to block 410 may be repeated for a range FHC signal levels. Additionally, a maximum FHC signal value may optionally be determined to correspond to a FHC signal level resulting in head-disk contact (block 428). The updated coefficients corresponding to the updated expected actuation profile and the maximum FHC signal level are stored so as to be accessible to the disk drive controller 160 and/or the fly height controller 150 (block 430).

In one embodiment, after the updated expected actuation profile is stored, the desired operation (e.g., read or write) may be initiated. Alternatively, as illustrated in FIG. 4, the method may return to block 412 to adjust the fly height with the recalibrated actuation profile.

Thus, in accordance with embodiments of the present invention, an expected actuation profile can be used to calibrate the fly height adjustment substantially continuously, while the disk drive is substantially continuously monitored for detection of head-disk contact. Further, embodiments of the present invention can prevent hard contact between the data head and the disk surface. Rather, a soft contact is sufficient to allow detection of head-disk contact.

While particular embodiments of the present invention have been disclosed, it is to be understood that various different modifications and combinations are possible and are contemplated within the true spirit and scope of the appended claims. There is no intention, therefore, of limitations to the exact abstract and disclosure herein presented.

What is claimed is:

1. A method, comprising:
   a) comparing a measured change in spacing between a transducer element and a storage element in response to a fly height control signal with an expected change in spacing for the applied fly height control signal; and
   b) detecting an event condition based on the comparison between the measured change in spacing and the expected change in spacing.

2. The method of claim 1, wherein the event condition is head-disk contact.

3. The method of claim 1, wherein the fly height control signal is indicative of a voltage applied to the thermal control module.

4. The method of claim 1, wherein the fly height control signal is indicative of a power applied to the thermal control module.

5. The method of claim 1, wherein the expected change in spacing is based on a polynomial function of the fly height control signal.

6. The method of claim 5, further comprising:
   updating coefficients of the polynomial function if the measured change in spacing is not within a predefined tolerance of the expected change in spacing.

7. The method of claim 5, wherein the polynomial function has the form:
   $Y=A*X^2+B*X^4$, where Y is expected actuation, X is the applied voltage level, and A and B are coefficients.

8. The method of claim 5, wherein the polynomial function having the form:
   $Y=A*X+B*X^2$, where Y is expected actuation, X is the applied power level, and A and B are coefficients.

9. A controller, comprising:
   a fly height control module adapted to compare a measured change in spacing between a transducer element and a storage element in response to a fly height control signal with an expected change in spacing for the applied fly height control signal,
   wherein the fly height control module is further adapted to detect an event condition based on the comparison between the measured change in spacing and the expected change in spacing.

10. The controller of claim 9, wherein the event condition is head-disk contact.

11. The controller of claim 9, wherein the fly height control signal is indicative of a voltage applied to a thermal control module.

12. The controller of claim 9, wherein the fly height control signal is indicative of a power applied to a thermal control module.

13. The controller of claim 9, wherein the expected change in spacing is based on a polynomial function of the fly height control signal.

14. The controller of claim 13, wherein the fly height control module is further adapted to update coefficients of the polynomial function if the measured change in spacing is not within a predefined tolerance of the expected change in spacing.

15. The controller of claim 13, wherein the polynomial function having the form:
   $Y=A*X^2+B*X^4$, where Y is expected actuation, X is the applied voltage level, and A and B are coefficients.

16. The controller of claim 13, wherein the polynomial function having the form:
   $Y=A*X+B*X^2$, where Y is expected actuation, X is the applied power level, and A and B are coefficients.

17. A storage device, comprising:
   means for comparing a measured change in spacing between a transducer element and a storage element in response to a fly height control signal with an expected change in spacing for the applied fly height control signal; and
   means for detecting an event condition based on the comparison between the measured change in spacing and the expected change in spacing.

18. The storage device of claim 17, wherein the event condition is head-disk contact.

19. The storage device of claim 17, wherein the expected change in spacing is based on a polynomial function of the fly height control signal.

20. The storage device of claim 19, further comprising:
   means for updating coefficients of the polynomial function if the measured change in spacing is not within a predefined tolerance of the expected change in spacing.

* * * * *